(12) United States Patent
Kakizaki et al.

(10) Patent No.: US 12,463,663 B2
(45) Date of Patent: Nov. 4, 2025

(54) CODING CIRCUIT, DECODING CIRCUIT, CODING METHOD, DECODING METHOD AND COMPUTER PROGRAM

(71) Applicant: NTT, Inc., Tokyo (JP)

(72) Inventors: Takeshi Kakizaki, Musashino (JP); Masanori Nakamura, Musashino (JP); Fukutaro Hamaoka, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/271,134

(22) PCT Filed: Jan. 8, 2021

(86) PCT No.: PCT/JP2021/000470
§ 371 (c)(1),
(2) Date: Jul. 6, 2023

(87) PCT Pub. No.: WO2022/149259
PCT Pub. Date: Jul. 14, 2022

(65) Prior Publication Data
US 2024/0080045 A1    Mar. 7, 2024

(51) Int. Cl.
*H03M 13/11* (2006.01)
*H03M 13/29* (2006.01)

(52) U.S. Cl.
CPC ... *H03M 13/1125* (2013.01); *H03M 13/2978* (2013.01)

(58) Field of Classification Search
None
See application file for complete search history.

(56) References Cited

U.S. PATENT DOCUMENTS

| 2011/0206158 | A1* | 8/2011 | Kim | H04L 1/005 375/295 |
| 2017/0099173 | A1* | 4/2017 | Yun | H04L 5/0044 |
| 2020/0127680 | A1 | 4/2020 | Kim | |
| 2021/0218496 | A1 | 7/2021 | Koganei et al. | |

FOREIGN PATENT DOCUMENTS

| CN | 108270515 A | 7/2018 |
| CN | 111200441 A | 5/2020 |
| CN | 111200481 A | 5/2020 |

(Continued)

OTHER PUBLICATIONS

Bipin Sankar Gopalakrishna Pillai et al., End-to-End Energy Modeling and Analysis of Long-Haul Coherent Transmission Systems, Journal of Lightwave Technology, vol. 32, No. 18, Sep. 15, 2014.

(Continued)

*Primary Examiner* — Guerrier Merant (57) ABSTRACT

There is provided an encoding circuit used for coherent digital signal processing, including: a serial-parallel circuit that divides input data into a plurality of pieces of divided data by serial-parallel conversion; a plurality of encoders that adds an error correction code to the divided data and encodes the divided data; and a bit conversion circuit that converts a bit sequence in order to make an amount of noise generated by a communication channel non-uniform among the plurality of pieces of divided data encoded by each of the plurality of encoders.

3 Claims, 8 Drawing Sheets

(56) References Cited

FOREIGN PATENT DOCUMENTS

| EP | 2843662 A1 * | 3/2015 | ......... G11B 20/1833 |
| JP | 2018520617 A | 7/2018 | |
| JP | 2021111864 A | 8/2021 | |
| WO | WO-2008087598 A2 * | 7/2008 | ........ H03M 13/2721 |
| WO | WO-2017/057206 A1 | 4/2017 | |

OTHER PUBLICATIONS

OIF-FEC-100G-01.0, 100G Forward Error Correction White Paper (May 2010), Optical Internetworking Forum.

F. Gabry et al., Multi-Kernel Construction of Polar Codes, 2017 IEEE International Conference on Communications Workshops (ICC Workshops), pp. 761-765 (2017).

H. Lin et al., Linear and Nonlinear Binary Kernels of Polar Codes of Small Dimensions With Maximum Exponents, IEEE Transactions on Information Theory, 61(10), 5253, (2015).

I. Tal et al., List Decoding of Polar Codes, IEEE Transactions on Information Theory, 61(5) 2213, (2015).

Georg Bocherer et al., Bandwidth Efficient and Rate-Matched Low-Density Parity-Check Coded Modulation, IEEE Transactions on Communications, vol. 63, No. 12, Dec. 2015, pp. 4651-4665.

Tsuyoshi Yoshida et al., Multilevel Coding with Flexible Probabilistic Shaping for Rate-Adaptive and Low-Power Optical Communications, OFC 2020, 2020, pp. 1-3.

Kiichi Sugitani et al., Performance Evaluation of WDM Channel Transmission for Probabilistic Shaping With Partial Multilevel Coding, Journal of Lightwave Technology, vol. 39, No. 9, May 1, 2021, pp. 2873-2879.

Takeshi Kakizaki et al., Low-complexity Channel Polarized Multilevel Coding for Modulation-format-independent Forward Error Correction, ECOC2021, (2021).

"Giuseppe Caire et al., Bit-Interleaved Coded Modulation, IEEE Transactions on Information Theory, vol. 44, No. 3, May 1998, pp. 927-946".

"Hideki Imai et al., A New Multilevel Coding Method Using Error-Correcting Codes, IEEE Transactions on Information Theory, vol. IT-23, No. 3, 1977, pp. 371-377".

"Takeshi Kakizaki et al., Low-complexity Channel-polarized Multilevel Coding for Probabilistic Amplitude Shaping, OFC2022, (2022)".

"Akira Yamada et al., A Study on Quantization for BP Decoding of Polar Codes, IEICE Technical Report, Mar. 2020, vol. 119, No. 448, pp. 263-268".

"Andreas Bisplinghoff et al., Low-Power, Phase-Slip Tolerant, Multilevel Coding for M-QAM, Journal of Lightwave Technology, vol. 35, No. 4, Feb. 15, 2017, pp. 1006-1014".

"Masoud Barakatain et al., Performance-Complexity Tradeoffs of Concatenated FEC for Higher-Order Modulation, Journal of Lightwave Technology, vol. 38, No. 11, Jun. 1, 2020, pp. 2944-2953".

"Yohei Koganei et al., Multilevel Coding With Spatially Coupled Repeat-Accumulate Codes for High-Order QAM Optical Transmission, Journal of Lightwave Technology, vol. 37, No. 2, Jan. 15, 2019, pp. 486-492".

International Search Report from related application No. PCT/JP2022/020454, dated Aug. 23, 2022.

* cited by examiner

CODING CIRCUIT, DECODING CIRCUIT, CODING METHOD, DECODING METHOD AND COMPUTER PROGRAM

CROSS-REFERENCE TO RELATED APPLICATIONS

This application is a 371 National Stage of International Application No. PCT/JP2021/000470, filed on Jan. 8, 2021. The entire disclosure of the above application is incorporated herein by reference.

TECHNICAL FIELD

The present invention relates to an encoding circuit, a decoding circuit, an encoding method, a decoding method, and a computer program.

BACKGROUND ART

Figure 9:
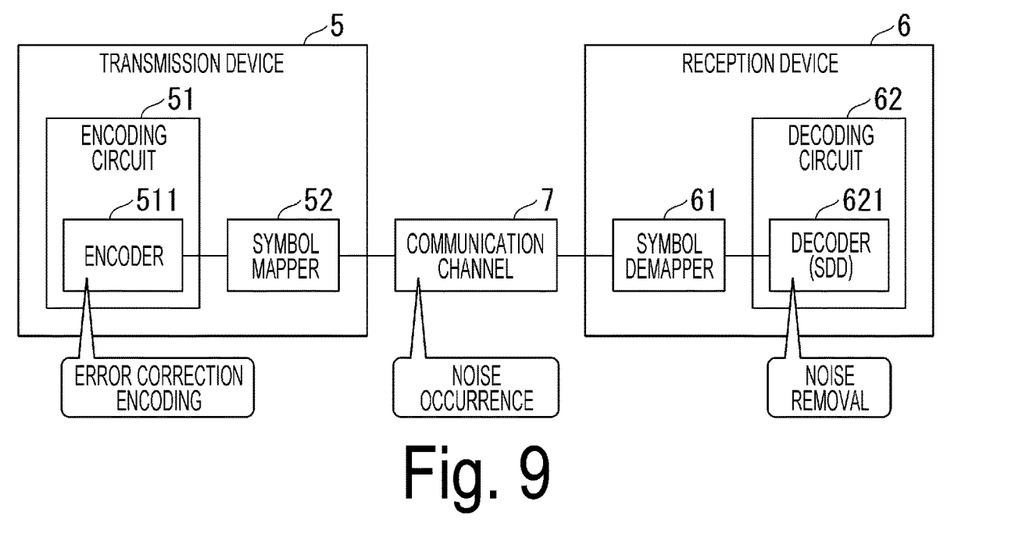
FIG. 9 is a diagram illustrating a configuration of a conventional communication system.

With an increase in Internet traffic, a large capacity of backbone optical transmission is required. In order to improve frequency utilization efficiency, a coherent digital signal processor (DSP) used in backbone optical transmission employs forward error correction (FEC) using soft-decision decoding (SDD), which is a high-performance decoding method (for example, refer to Non Patent Literature 1). FIG. 9 illustrates a configuration of a conventional communication system using SDD as a decoding method.

The conventional communication system includes a transmission device 5 and a reception device 6. The transmission device 5 and the reception device 6 are connected via a communication channel 7. The transmission device 5 includes an encoding circuit 51 and a symbol mapper 52. The encoding circuit 51 includes an encoder 511. The encoder 511 encodes data to be transmitted (hereinafter, referred to as "transmission target data"). The symbol mapper 52 maps the transmission target data encoded by the encoder 511 according to the modulation method to generate transmission data. The transmission device 5 transmits the generated transmission data to the reception device 6 via the communication channel 7. The transmission data transmitted via the communication channel 7 has noise generated in the communication channel 7 added thereto and is received by the reception device 6.

The reception device 6 includes a symbol demapper 61 and a decoding circuit 62.

The symbol demapper 61 receives the transmission data transmitted via the communication channel 7 and demodulates the received transmission data. The decoding circuit 62 includes a decoder 621. The decoder 621 decodes the demodulated transmission data. For example, the decoder 621 decodes the transmission data using SDD.

SDD has high decoding accuracy, but has a large calculation amount and large power consumption. Therefore, hard-decision decoding (HDD) is used as a decoding method instead of SDD (for example, refer to Non Patent Literature 2). The configuration using HDD as the decoding method is different from the configuration using SDD in that the decoder 621 illustrated in FIG. 9 decodes the transmission data using HDD. By using HDD as the decoding method, although the decoding accuracy is inferior to that of SDD, the calculation amount can be reduced.

Figure 10:
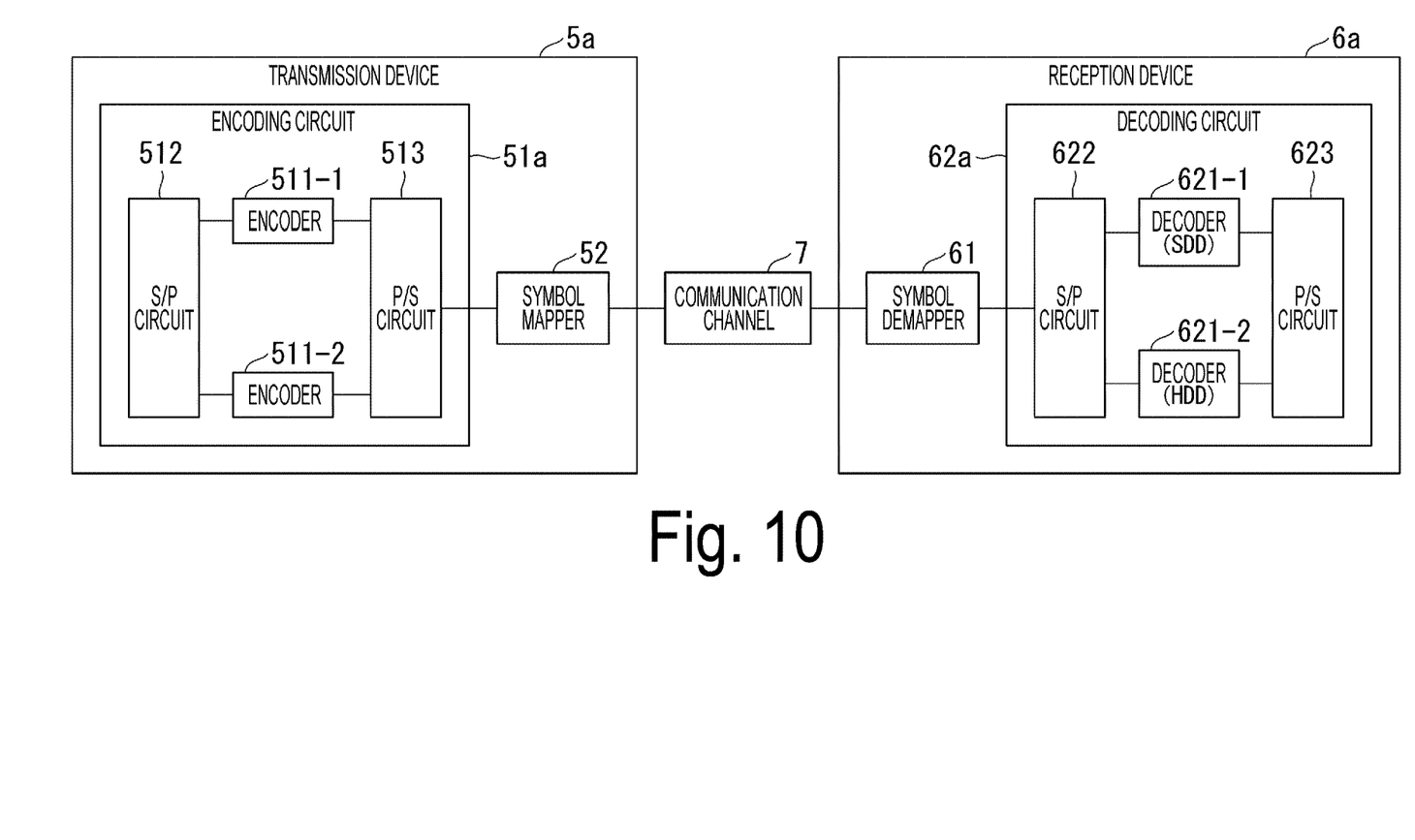
FIG. 10 is a diagram illustrating a configuration of a conventional communication system.

As a conventional communication system, a configuration in which a transmission device includes a plurality of encoders and a reception device includes a plurality of decoders has also been proposed. In such a configuration, all or some decoders use the decoding method of HDD to reduce the calculation amount. FIG. 10 illustrates a configuration of a conventional communication system in which the transmission device includes a plurality of encoders and the reception device includes a plurality of decoders. Note that FIG. 10 illustrates a configuration in which HDD is used as a decoding method by some decoders.

The conventional communication system includes a transmission device 5a and a reception device 6a. The transmission device 5a and the reception device 6a are connected via the communication channel 7. The transmission device 5a includes an encoding circuit 51a and a symbol mapper 52. The encoding circuit 51a includes an S/P circuit 512, encoders 511-1 and 511-2, and a P/S circuit 513. The S/P circuit 512 divides the transmission target data into a plurality of pieces of data by performing serial-parallel conversion on the input transmission target data. The divided data is input to different encoders 511-1 and 511-2. The encoders 511-1 and 511-2 encode input data. The P/S circuit 513 converts the encoded data output from the encoders 511-1 and 511-2 into serial data by parallel-serial conversion. The symbol mapper 52 maps the data converted by the P/S circuit 513 according to the modulation method to generate transmission data.

The reception device 6a includes the symbol demapper 61 and a decoding circuit 62a.

The symbol demapper 61 receives the transmission data transmitted via the communication channel 7 and demodulates the received transmission data. The decoding circuit 62a includes an S/P circuit 622, decoders 621-1 and 621-2, and a P/S circuit 623. The S/P circuit 622 divides the transmission data into a plurality of pieces of data by performing serial-parallel conversion on the demodulated transmission data. The divided data is input to different decoders 621-1 and 621-2. The decoders 621-1 and 621-2 decode the input data. For example, the decoder 621-1 decodes data using SDD, and the decoder 621-2 decodes data using HDD. The P/S circuit 623 converts the decoded data output from the decoders 621-1 and 621-2 into serial data by parallel-serial conversion.

CITATION LIST

Non Patent Literature

Non Patent Literature 1: Bipin Sankar Gopalakrishna Pillai, Behnam Sedighi, N. Prasanth Anthapadmanabhan, William Shieh, Kerry J. Hinton, and Rodney S. Tucker, "End-to-End Energy Modeling and Analysis of Long-Haul Coherent Transmission Systems", JOURNAL OF LIGHTWAVE TECHNOLOGY, VOL. 32, NO. 18, Sep. 15, 2014

Non Patent Literature 2: "OIF-FEC-100G-01.0100G Forward Error Correction White Paper (May 2010)", OPTICAL INTERNETWORKING FORUM

SUMMARY OF INVENTION

Technical Problem

As described above, the power consumption is expected to be reduced by replacing all or some decoding methods with HDD. However, there is a problem that performance deterioration increases in backbone optical transmission requiring high frequency utilization efficiency.

In view of the above circumstances, an object of the present invention is to provide a technique capable of performing decoding with high accuracy while reducing the calculation amount in decoding.

Solution to Problem

According to an aspect of the present invention, there is provided an encoding circuit used for coherent digital signal processing, including: a serial-parallel circuit that divides input data into a plurality of pieces of divided data by serial-parallel conversion; a plurality of encoders that adds an error correction code to each of the divided data and encodes each of the divided data; and a bit conversion circuit that converts a bit sequence in order to make an amount of noise generated by a communication channel non-uniform among the plurality of pieces of divided data encoded by each of the plurality of encoders.

According to another aspect of the present invention, there is provided a decoding circuit used for coherent digital signal processing, including: a serial-parallel circuit that divides input data into a plurality of pieces of divided data by serial-parallel conversion; a likelihood calculation circuit that calculates a likelihood of decoding based on the plurality of pieces of divided data and information on noise generated in a communication channel; and a plurality of decoders that decodes the plurality of pieces of divided data using the likelihood as an input.

According to still another aspect of the present invention, there is provided an encoding method used for coherent digital signal processing, including: dividing input data into a plurality of pieces of divided data by serial-parallel conversion; adding an error correction code to each of the divided data and encoding each of the divided data; and converting a bit sequence in order to make an amount of noise generated by a communication channel non-uniform among the plurality of pieces of encoded divided data.

According to still another aspect of the present invention, there is provided a decoding method used for coherent digital signal processing, including: dividing input data into a plurality of pieces of divided data by serial-parallel conversion; calculating a likelihood of decoding based on the plurality of pieces of divided data and information on noise generated in the communication channel; and decoding the plurality of pieces of divided data using the likelihood as an input.

According to still another aspect of the present invention, there is provided a computer program for causing a computer to execute processing of dividing input data into a plurality of pieces of divided data by serial-parallel conversion, adding an error correction code to each of the divided data and encoding each of the divided data, and converting a bit sequence in order to make an amount of noise generated by a communication channel non-uniform among the plurality of pieces of encoded divided data.

According to still another aspect of the present invention, there is provided a computer program for causing a computer to execute processing of dividing input data into a plurality of pieces of divided data by serial-parallel conversion, calculating a likelihood of decoding based on the plurality of pieces of divided data and information on noise generated in the communication channel, and decoding the plurality of pieces of divided data using the likelihood as an input.

Advantageous Effects of Invention

According to the present invention, it is possible to perform decoding with high accuracy while reducing the calculation amount in decoding.

DESCRIPTION OF EMBODIMENTS

Hereinafter, an embodiment of the present invention will be described in detail with reference to drawings.

First Embodiment

Figure 1:
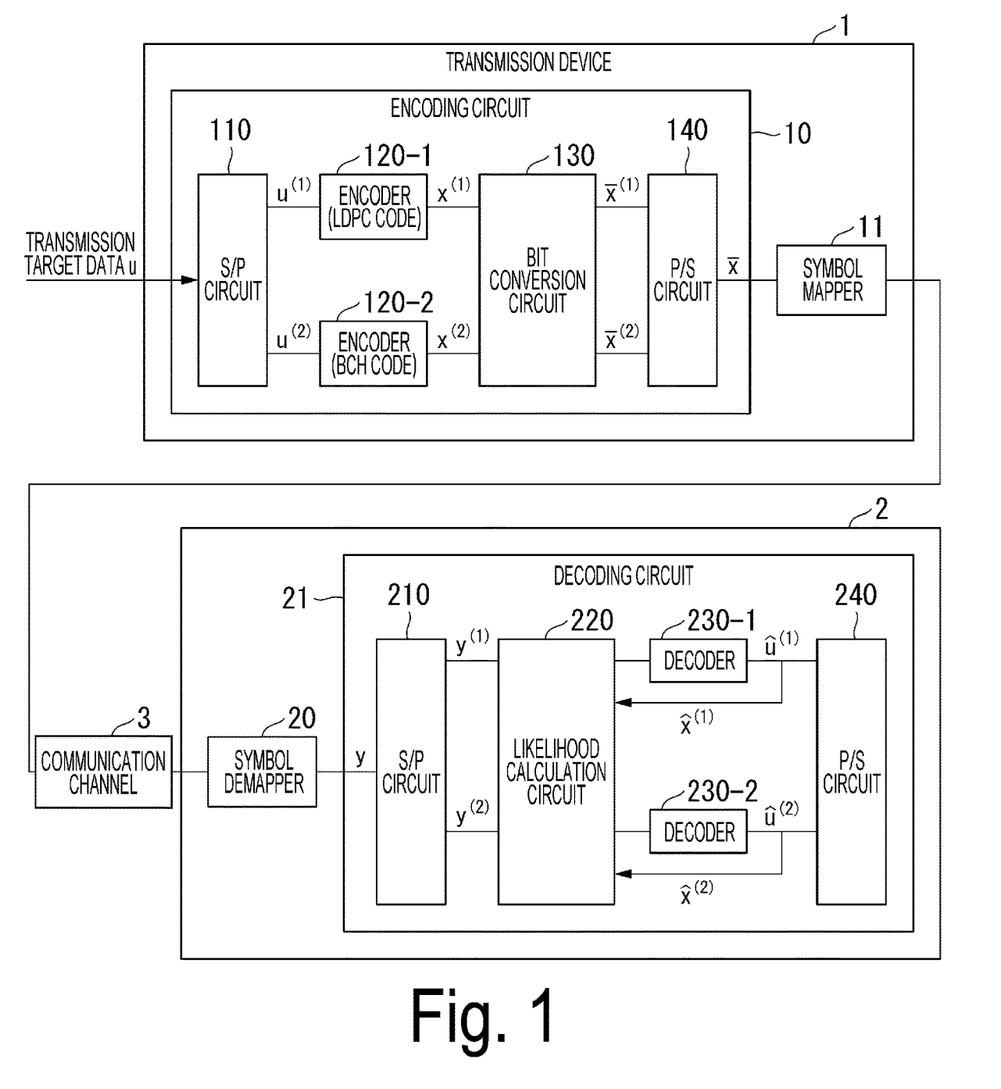
FIG. 1 is a diagram illustrating a system configuration of a communication system according to a first embodiment.

FIG. 1 is a diagram illustrating a system configuration of a communication system according to a first embodiment. The communication system includes a transmission device 1 and a reception device 2. The transmission device 1 and the reception device 2 are connected via a communication channel 3. Note that, in the following description, the communication channel 3 is assumed to be an additive white Gaussian noise (AWGN) communication channel. In a communication system, a coherent DSP technology is used.

The transmission device 1 includes an encoding circuit 10 and a symbol mapper 11.

The encoding circuit 10 includes an S/P circuit 110, a plurality of encoders 120-1 and 120-2, a bit conversion circuit 130, and a P/S circuit 140. The encoding circuit 10 newly includes a bit conversion circuit 130 as compared with the conventional encoding circuit 51a illustrated in FIG. 10.

The S/P circuit 110 divides the transmission target data into a plurality of pieces of data by performing serial-parallel conversion on the input transmission target data.

The encoders 120-1 and 120-2 encode input data. For example, the encoder 120-1 encodes data using a low-density parity-check (LDPC) code, and the encoder 120-2 encodes data using a BCH code. That is, the encoder 120-1 is an encoder using SDD, and the encoder 120-2 is an encoder using HDD.

The bit conversion circuit 130 converts a bit sequence of encoded data in order to make noise generated in each code non-uniform in a time division direction.

The P/S circuit 140 converts the converted data output from the bit conversion circuit 130 into serial data by parallel-serial conversion.

The symbol mapper 11 maps the data converted by the P/S circuit 140 according to the modulation method to generate transmission data. For example, it is assumed that the symbol mapper 11 uses binary phase shift keying (BPSK) as a modulation method.

The reception device 2 includes a symbol demapper 20 and a decoding circuit 21.

The symbol demapper 20 receives the transmission data transmitted via the communication channel 3 and demodulates the received transmission data in the demodulation method corresponding to the modulation method. For example, it is assumed that the symbol demapper 20 uses BPSK as a demodulation method.

The decoding circuit 21 includes an S/P circuit 210, a likelihood calculation circuit 220, decoders 230-1 to 230-2, and a P/S circuit 240. The decoding circuit 21 newly includes a likelihood calculation circuit 220 as compared with the conventional decoding circuit 62a illustrated in FIG. 10.

The S/P circuit 210 divides the transmission data into a plurality of pieces of data by performing serial-parallel conversion on the transmission data demodulated by the symbol demapper 20.

The likelihood calculation circuit 220 calculates the likelihood based on the data output from the S/P circuit 210 and the communication channel information. The communication channel information represents a noise distribution of the communication channel 3. Most typical in communication systems is a Gaussian distribution of the average μ variance σ. The communication channel information can be measured by a spectrum analyzer or the like. It is assumed that the communication channel information is measured in advance and stored in the likelihood calculation circuit 220.

The decoders 230-1 to 230-2 decode input data. For example, the decoder 230-1 decodes data using SDD, and the decoder 230-2 decodes data using HDD.

The P/S circuit 240 converts the decoded data output from the decoders 230-1 and 230-2 into serial data by parallel-serial conversion.

Figure 2:
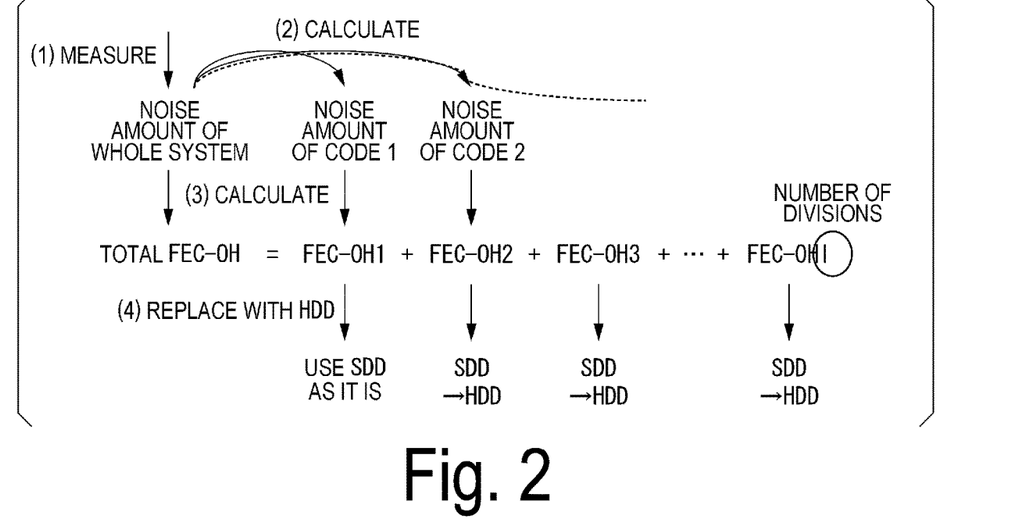
FIG. 2 is a diagram for explaining design guidelines for an encoder and a decoder according to the present invention.

Next, design guidelines of the encoder 120 and the decoder 230 in the present invention will be described with reference to FIG. 2.

First, a rough flow of the present invention will be described. In the present invention, noise is made non-uniform by conversion by the bit conversion circuit 130. Then, after separation into a communication channel with large noise (for example, a communication channel in which the amount of noise is equal to or greater than a threshold value) and a communication channel with small noise (for example, a communication channel in which the amount of noise is less than a threshold value), SDD is applied to the communication channel with large noise and HDD is applied to the communication channel with small noise.

An object of the present invention is to "reduce decoding power as much as possible (that is, replace with HDD)" under the condition that the allowable "performance deterioration amount" is defined and the "division number (the number of encoders 120 and decoders 230)" is limited in relation to the delay amount and the circuit scale.

In order to realize the above object, the following (1) to (4) are performed before the start of the processing.

(1) The user measures the amount of noise in the entire communication system. The amount of noise in the entire communication system can be measured by, for example, a spectrum analyzer or the like.

(2) Since the user knows the amount of noise of the entire communication system in advance by measurement in advance, the user calculates the amount of noise from code 1 to code l (l is an integer of 2 or more) used by each of the encoders 120-1 to 120-l. The amount of noise from code 1 to code l may be theoretically calculated, or a plurality of bit strings may be obtained by a Monte Carlo method. A calculation method in the case of theoretical calculation is calculated by Formula (6) described later.

(3) The user calculates forward error correction-over head (FEC-OH) of the code applied by the encoder 120 according to each noise amount. Here, a method of calculating FEC-OH of the code applied by the encoder 120 will be described with reference to FIG. 3. In the encoder 120, it is necessary to add redundant bits m bits illustrated in FIG. 3 to the information bits k bits in accordance with the amount of noise No generated in the communication channel 3 for error correction. The amount of noise generated in the communication channel 3 corresponds to the amount of noise in the entire communication system. The upper bound of FEC-OH (degree of redundancy) is expressed by the following Formula (1).

Figure 3:
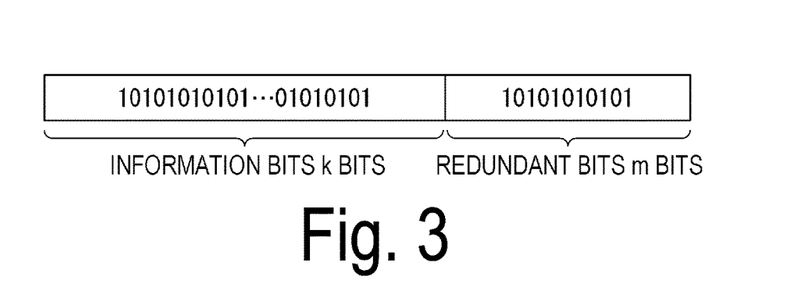
FIG. 3 is a diagram for explaining a method of calculating FEC-OH of a code applied in an encoder.

[Math. 1]

$$\text{Degree of redundancy (FEC-OH)} = (m/k) \times 100[\%] \quad (1)$$

Note that it is necessary to satisfy $k/(k+\text{FEC-OH}) < \frac{1}{2} \times \log_2(1+E_b/N_0) =: C$ (communication channel capacity). A margin is provided between $(k/k+\text{FEC-OH})$ and $\frac{1}{2} \times \log_2(1+E_b/N_0)$. The margin amount depends on the code. $E_b$ represents energy per bit. In addition, $N_0$ is a noise spectral density. The FEC-OH is set based on the $E_b/N_0$ targeted by the system.

The description will return to FIG. 2, (4) The user replaces SDD with HDD as the decoding method used in the decoder 230 as much as possible according to the allowable performance deterioration amount. Basically, a part having a small FEC-OH is preferentially replaced with HDD. The reason why HDD is preferentially replaced from the place where the FEC-OH is small is that, when the FEC-OH is small, deterioration when SDD is replaced with HDD is also small (refer to Non Patent Literature 2).

Figure 4:
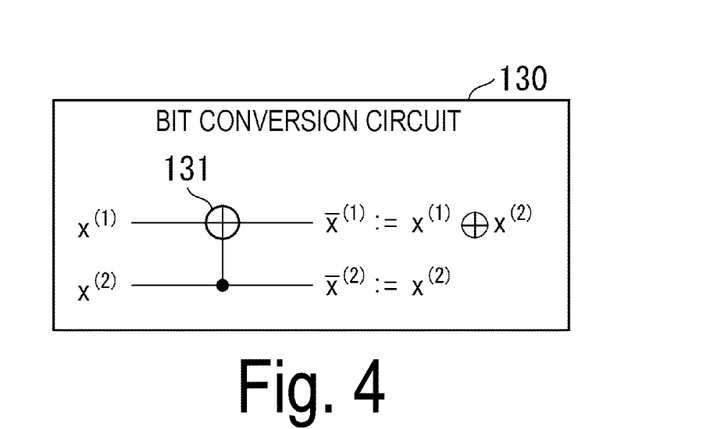
FIG. 4 is a diagram illustrating a specific configuration of a bit conversion circuit according to the first embodiment.

FIG. 4 is a diagram illustrating a specific configuration of the bit conversion circuit 130 according to the first embodiment. FIG. 4 illustrates a configuration of the bit conversion circuit 130 in a case where the encoding circuits 10 include two encoders 120-1 and 120-2.

A symbol indicated by code 131 in FIG. 4 represents an exclusive OR of each bit. The bit conversion circuit 130 calculates an exclusive OR of a code word $x^{(1)}$ output from the encoder 120-1 and the code word $x^{(2)}$ output from the encoder 120-2 to convert the code word $x^{(1)}$ into a code word $-x^{(1)}$ ("−" in −x is on x, and the same applies hereinafter). Further, the bit conversion circuit 130 converts the code word $x^{(2)}$ output from the encoder 120-2 into a code word $-x^{(2)}$.

Figure 5:
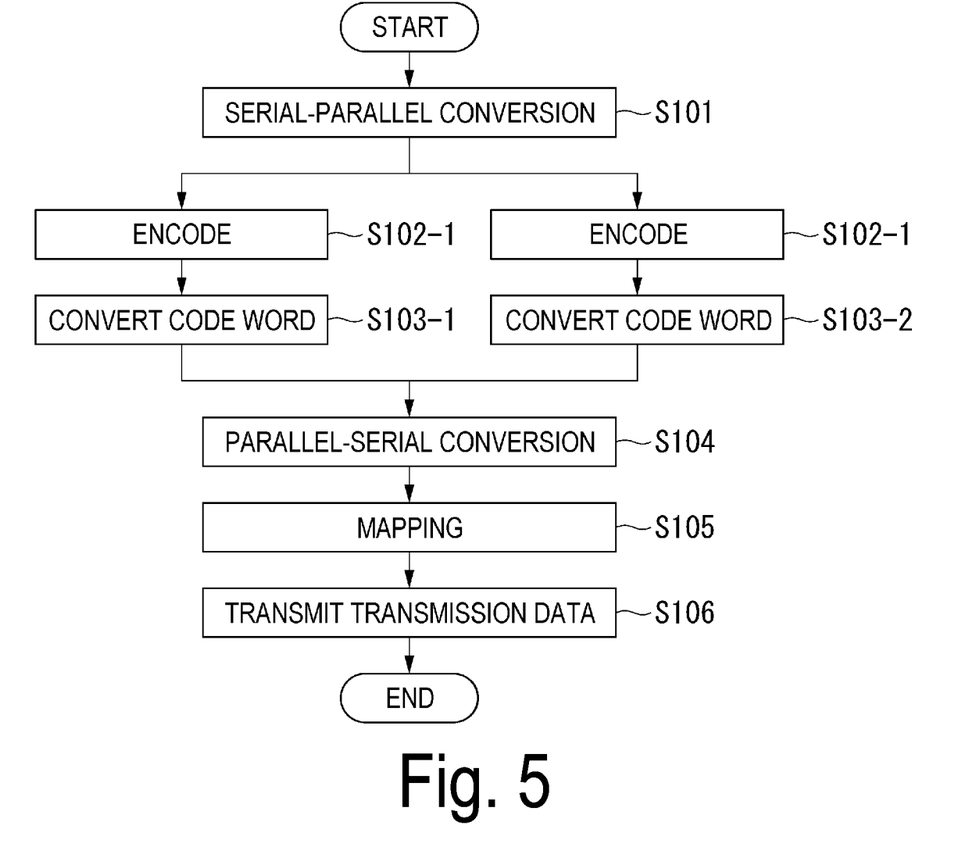
FIG. 5 is a flowchart illustrating a flow of processing of a transmission device according to the first embodiment.

FIG. 5 is a flowchart illustrating a flow of processing of the transmission device 1 according to the first embodiment.

The S/P circuit 110 divides transmission target data u into a plurality of pieces of data by performing serial-parallel conversion on the input transmission target data u (step S101). Specifically, the S/P circuit 110 divides k-bit data $u \in \{0,1\}^k$ into $k_1$-bit data $u^{(1)}$ and $k_2$-bit data $u^{(2)}$ ($k_1+k_2=k$). The S/P circuit 110 outputs the divided data $u^{(1)}$ to the encoder 120-1 and outputs the data $u^{(2)}$ to the encoder 120-2.

The encoder 120-1 encodes the data $u^{(1)}$ output from the S/P circuit 110 (step S102-1). Accordingly, the encoder 120-1 acquires n/2-bit data $x^{(1)}$ which is a code word. Here, n represents the length of the entire code. Therefore, in the first embodiment, the encoder 120-1 acquires n/2-bit data $x^{(1)}$. The encoder 120-1 outputs the acquired code word to the bit conversion circuit 130.

Similarly, the encoder 120-2 encodes the data $u^{(2)}$ output from the S/P circuit 110 (step S102-2). Accordingly, the encoder 120-2 acquires n/2-bit data $x^{(2)}$ which is a code word. In the first embodiment, the encoder 120-2 acquires n/2-bit data $x^{(2)}$. The encoder 120-2 outputs the acquired code word to the bit conversion circuit 130.

The bit conversion circuit 130 acquires code words output from each of the encoders 120-1 and 120-2. The bit conversion circuit 130 converts the bit string of the acquired code word. Specifically, the bit conversion circuit 130 converts the data $x^{(1)}$ output from the encoder 120-1 into data $-x^{(1)}$ (step S103-1). The bit conversion circuit 130 converts the data $x^{(2)}$ output from the encoder 120-2 into data $-x^{(2)}$ (step S103-2). The bit conversion circuit 130 outputs the converted data $-x^{(1)}$ and $-x^{(2)}$ to the P/S circuit 140.

The P/S circuit 140 converts the data $-x^{(1)}$ and the data $-x^{(2)}$ output from the bit conversion circuit 130 into serial data by parallel-serial conversion (step S104). Specifically, the P/S circuit 140 combines the data $-x^{(1)}$ and the data $-x^{(2)}$ to generate n-bit data $-x(-x^{(1)}, -x^{(2)})$. The P/S circuit 140 outputs the data $-x$ to the symbol mapper 11. The symbol mapper 11 maps the data $-x$ converted by the P/S circuit 140 according to the modulation method to generate transmission data (step S105). The encoding circuit 10 transmits the generated transmission data to the reception device 2 (step S106).

Figure 6:
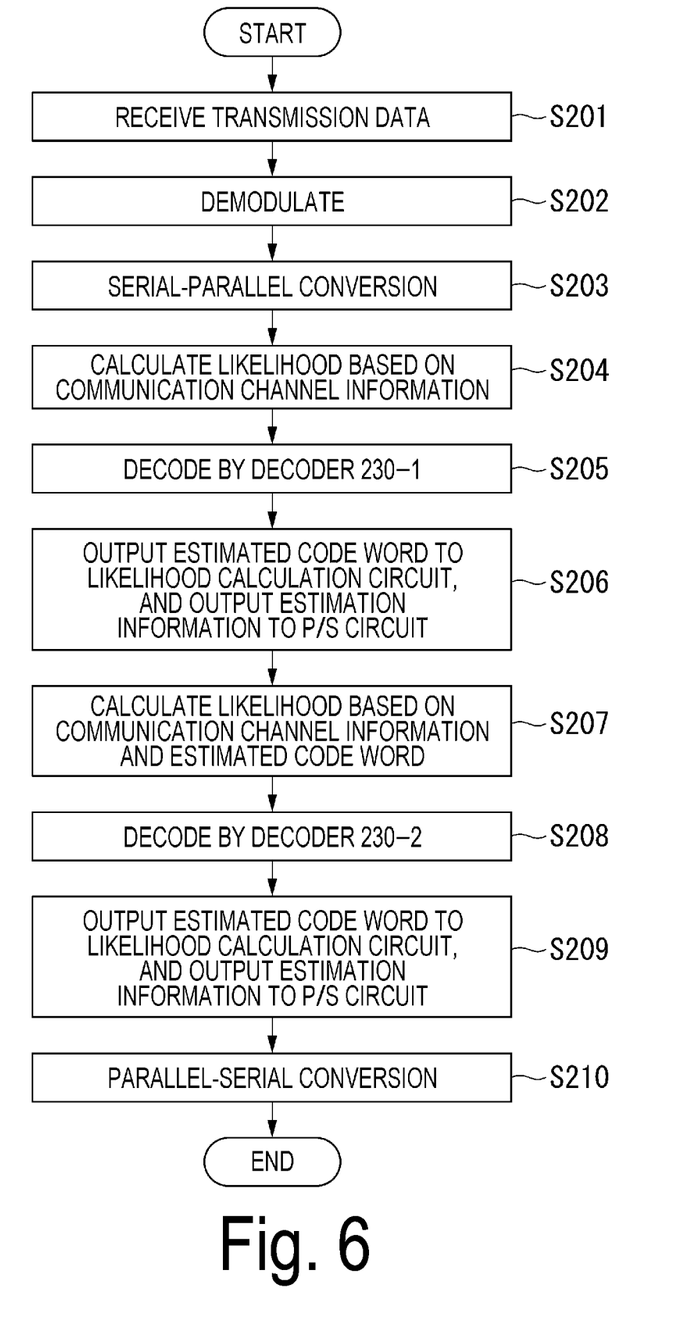
FIG. 6 is a flowchart illustrating a flow of processing of a reception device according to the first embodiment.

FIG. 6 is a flowchart illustrating a flow of processing of the reception device 2 according to the first embodiment.

The symbol demapper 20 receives the transmission data transmitted through the communication channel 3 (step S201). The symbol demapper 20 demodulates the received transmission data (step S202). The symbol demapper 20 outputs the demodulated data y to the S/P circuit 210. The S/P circuit 210 divides the data y into a plurality of pieces of data by performing serial-parallel conversion on the data y output from the symbol demapper 20 (step S203). Specifically, the S/P circuit 210 divides the data $y(y^{(1)}, y^{(2)})$ into data $y^{(1)}$ and data $y^{(2)}$. The S/P circuit 210 outputs the divided data $y^{(1)}$ and data $y^{(2)}$ to the likelihood calculation circuit 220.

The likelihood calculation circuit 220 calculates the likelihood based on the data $y^{(1)}$ and the data $y^{(2)}$ output from the S/P circuit 210 and the communication channel information P1 (step S204). Here, it is assumed that the communication channel information P1 is represented by the following Formula (2).

[Math. 2]
$$P1(y_i^{(1)} | \bar{x}_i^{(1)}), P1(y_i^{(2)} | \bar{x}_i^{(2)}) \qquad (2)$$

The likelihood calculation circuit 220 calculates a likelihood P11 based on the following Formula (3). In the first embodiment, it is assumed that $P(x_i) = \frac{1}{2}$. i is an integer of 1 or more.

[Math. 3]
$$P11(y_i^{(1)}, y_i^{(2)} | x_i^{(1)}) = \frac{1}{2}\sum_{x_i^{(2)}} P(y_i^{(1)} | x_i^{(1)} \oplus x_i^{(2)})P(y_i^{(2)} | x_i^{(2)}) \qquad (3)$$

The likelihood calculation circuit 220 outputs the calculation result to the decoder 230-1. The decoder 230-1 decodes the calculation result output from the likelihood calculation circuit 220 (step S205). As a result, the decoder 230-1 acquires the estimated code word $\hat{x}^{(1)}$ ("^" in ^x is on x, and the same applies hereinafter) and the estimation information $\hat{u}^{(1)}$ ("^" in ^u is on u, and the same applies hereinafter). The estimated code word represents a code word which is estimated. The estimation information represents an estimation result of the divided data. The decoder 230-1 outputs the estimated code word $\hat{x}^{(1)}$ to the likelihood calculation circuit 220, and outputs the estimation information $\hat{u}^{(1)}$ to the P/S circuit 240.

The likelihood calculation circuit 220 calculates the likelihood based on the estimated code word $\hat{x}^{(1)}$ output from the decoder 230-1 and the communication channel information P1 (step S207). Specifically, the likelihood calculation circuit 220 calculates a likelihood P12 based on the following Formula (4).

[Math. 4]
$$P12(y_i^{(1)}, y_i^{(2)}, \hat{x}_i^{(1)} | \hat{x}_i^{(2)}) = \frac{1}{2}P(y_i^{(1)} | \hat{x}_i^{(1)} \oplus x_i^{(2)})P(y_i^{(2)} | x_i^{(2)}) \qquad (4)$$

The likelihood calculation circuit 220 outputs the calculation result to the decoder 230-2. The decoder 230-2 decodes the calculation result output from the likelihood calculation circuit 220 (step S208). Accordingly, the decoder 230-2 acquires the estimated code word $\hat{x}^{(2)}$ and the estimation information $\hat{u}^{(2)}$. The decoder 230-2 outputs the estimated code word $\hat{x}^{(2)}$ to the likelihood calculation circuit 220, and outputs the estimation information $\hat{u}^{(2)}$ to the P/S circuit 240.

The P/S circuit 240 converts the estimation information $\hat{u}^{(1)}$ output from the decoder 230-1 and the estimation information $\hat{u}^{(2)}$ output from the decoder 230-2 into serial data by parallel-serial conversion (step S210). Specifically, the P/S circuit 240 combines the estimation information $\hat{u}^{(1)}$ and the estimation information $\hat{u}^{(2)}$ to generate the estimation information $\hat{u}(\hat{u}^{(1)}, \hat{u}^{(2)})$.

Figure 7:
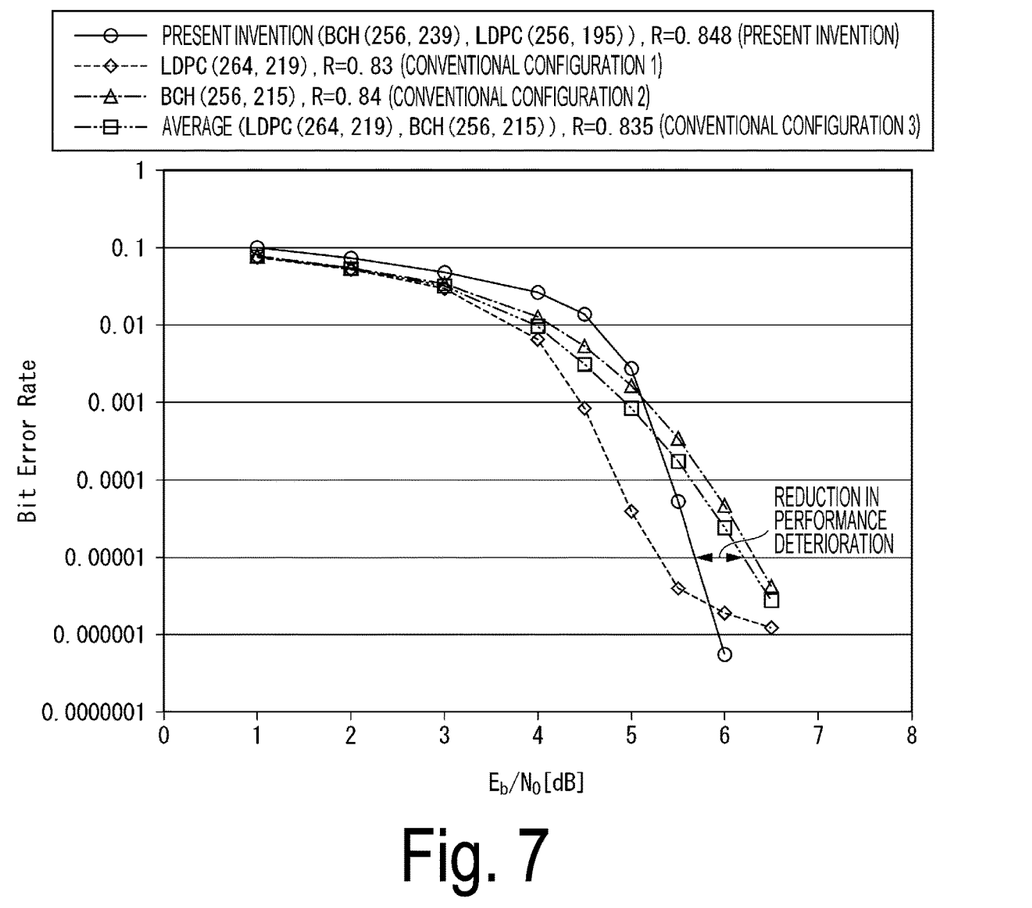
FIG. 7 is a diagram for explaining an evaluation result using the method of the present invention.

Next, evaluation results using the method of the present invention will be described with reference to FIG. 7.

Under an AWGN environment, $E_b/N_0$-BER characteristics of an LDPC code and a BCH code during BPSK modulation were evaluated, respectively. In the present invention, the LDPC code is used in the encoder 120-1, and the BCH code is used in the encoder 120-2. In FIG. 7, for comparison, in a case where the LDPC code and the BCH code are equally used in the conventional configuration 3 illustrated in FIG. 10, for example, the average of the BERs of the LDPC code used in the encoder 511-1 and the BCH code used in the encoder 511-2 is also calculated. A conventional configuration 1 illustrated in FIG. 7 is a configuration in which the decoder 621 uses SDD in FIG. 9, and a conventional configuration 2 is a configuration in which the decoder 621 uses HDD in FIG. 9. As illustrated in the graph of FIG. 7, it can be confirmed that the performance deterioration is reduced by the configuration of the present invention as compared with the case where the BCH code which is HDD or SDD and HDD are allocated as in the conventional configuration 3.

According to the communication system configured as described above, it is possible to perform decoding with high accuracy while reducing the calculation amount in decoding. Specifically, the encoding circuit 10 includes the encoders 120-1 to 120-*l* of the plurality of error correction codes, and a bit conversion circuit that makes the amount of noise generated in the bit sequence non-uniform by using code words output from the plurality of encoders 120-1 to 120-*l*. The decoding circuit 21 includes a likelihood calculation circuit 220 that calculates likelihood information of decoding based on communication channel information, and a plurality of decoders 230-1 to 230-1 that outputs decoding information with the likelihood information as an input. The output of the decoding information by the decoder 230 is sequentially executed by the plurality of decoders 230-1 to 230-1. Each decoder 230 decodes data using the likelihood information updated by the likelihood calculation circuit 220 as an input based on the decoding information output by the preceding decoder 230. As described above, by making the noise amount of the code word output from the encoders 120-1 to 120-*l* non-uniform for each encoder by the bit conversion circuit 130 in the encoding circuit 10, in the corresponding decoder 230 in the decoding circuit 21, the decoder 230 using HDD is designed to decode data to which small noise is added, and the decoder 230 using SDD is designed to decode data to which large noise is added, and accordingly, it is possible to perform decoding with high accuracy while reducing the calculation amount in decoding.

Second Embodiment

In the first embodiment, the case where the number of encoders included in the encoding circuit is two and the number of decoders included in the decoding circuit is two has been described as an example. The number of encoders included in the encoding circuit and the number of decoders included in the decoding circuit may be two or more. Therefore, in the second embodiment, a configuration in a case where the number of encoders and decoders is not limited to two will be described.

Figure 8:
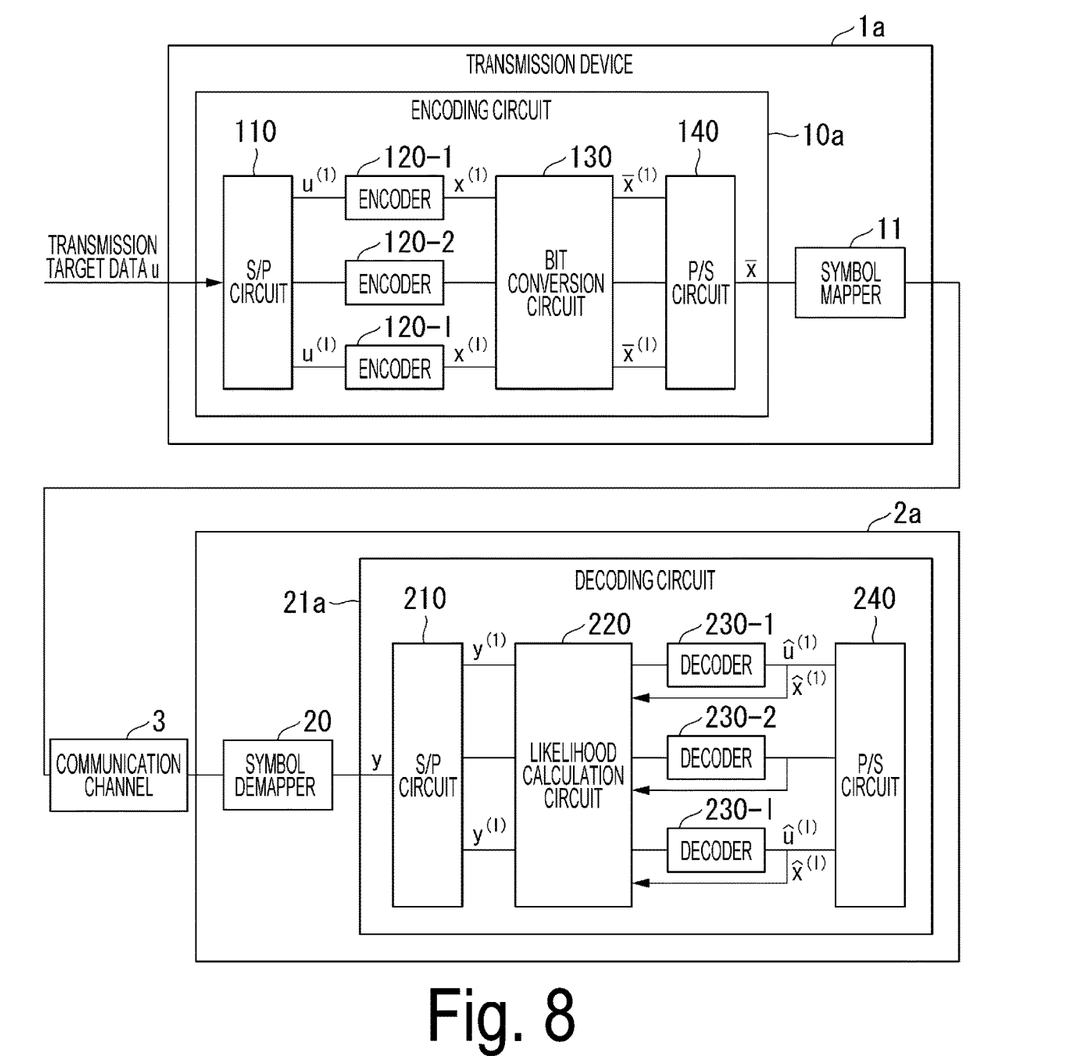
FIG. 8 is a diagram illustrating a system configuration of a communication system according to a second embodiment.

FIG. 8 is a diagram illustrating a system configuration of a communication system according to a second embodiment. The communication system includes a transmission device 1*a* and a reception device 2*a*. The transmission device 1*a* and the reception device 2*a* are connected via the communication channel 3.

A transmission device 1*a* includes an encoding circuit 10*a* and the symbol mapper 11. The encoding circuit 10*a* is different from the encoding circuit 10 in that 1 encoders 120 are provided. On the other hand, the basic operation performed by the encoding circuit 10*a* is similar to that of the encoding circuit 10.

The reception device 2*a* includes the symbol demapper 20 and a decoding circuit 21*a*. The decoding circuit 21*a* is different from the decoding circuit 21 in that 1 decoders 230 are provided. On the other hand, the basic operation performed by the decoding circuit 21*a* is similar to that of the decoding circuit 21.

Hereinafter, processing performed by the transmission device 1*a* in the second embodiment will be described with reference to FIG. 5.

The S/P circuit 110 divides k-bit data $u \in \{0,1\}^k$ into $k_1$-bit data $u^{(1)}$, ... and $k_2$-bit data $u^{(1)}$ in step S101 ($k_1+k_2+\ldots+k_l=k$). The S/P circuit 110 outputs the divided data $u^{(1)}$ to $u^{(l)}$ to the corresponding encoders 120-1 to 120-*l*, respectively.

The encoders 120-1 to 120-*l* encode the data $u^{(1)}$ to $u^{(l)}$ output from the S/P circuit 110 in step S102. Accordingly, the encoders 120-1 to 120-*l* acquire n/1-bit data $x^{(1)}$ to $x^{(l)}$ which are code words. The encoders 120-1 to 120-1 output the acquired code word to the bit conversion circuit 130.

The bit conversion circuit 130 acquires code words output from each of the encoders 120-1 to 120-*l* in step S103. The bit conversion circuit 130 converts the bit string of the acquired code word. Specifically, the bit conversion circuit 130 converts the data $x^{(1)}$ to data $x^{(l)}$ output from each of the encoders 120-1 to 120-*l* into data $-x^{(1)}$ to data $-x^{(l)}$. The bit conversion circuit 130 outputs the converted data $-x^{(1)}$ to $-x^{(l)}$ to the P/S circuit 140. Note that the processing of steps S105 and S106 is the same as that in the first embodiment.

The P/S circuit 140 converts the data $-x^{(1)}$ to the data $-x^{(l)}$ output from the bit conversion circuit 130 into serial data by parallel-serial conversion in step S104. Specifically, the P/S circuit 140 combines the data $-x^{(1)}$ to the data $-x^{(l)}$ to generate n-bit data $-x(-x^{(1)}, \ldots, -x^{(l)})$. The P/S circuit 140 outputs the data $-x$ to the symbol mapper 11.

Next, processing performed by the reception device 2*a* in the second embodiment will be described with reference to FIG. 6.

In step S201, the symbol demapper 20 receives the transmission data transmitted through the communication channel 3. In step S202, the symbol demapper 20 demodulates the received transmission data. The symbol demapper 20 outputs the demodulated data y to the S/P circuit 210. In step S203, the S/P circuit 210 divides the data y into a plurality of pieces of data by performing serial-parallel conversion on the data y output from the symbol demapper 20. Specifically, the S/P circuit 210 divides the data $y(y^{(1)}, \ldots, y^{(l)})$ into the data $y^{(1)}, \ldots$, and data $y^{(l)}$. The S/P circuit 210 outputs the divided data $y^{(1)}, \ldots$, and $y^{(l)}$ to the likelihood calculation circuit 220.

The processing from step S204 to step S209 is performed as follows in the second embodiment.

The likelihood calculation circuit 220 calculates the likelihood based on the data $y^{(1)}, \ldots$, and $y^{(l)}$ output from the S/P circuit 210 and the communication channel information P2. Here, it is assumed that the communication channel information P2 is represented by the following Formula (5). Note that j in Formula (5) is an integer of 1 or more.

[Math. 5]

$$P2(y_i^{(1)}|\bar{x}_i^{(1)}), \ldots, P2(y_i^{(j)}|\bar{x}_i^{(j)}) \tag{5}$$

The likelihood calculation circuit 220 calculates a likelihood P21 based on the following Formula (6).

[Math. 6]

$$P21(y_i^{(1)}, \ldots, y_i^{(j)}, \hat{x}_i^{(1)}, \ldots, \hat{x}_i^{(j-1)}|x_i^{(j)}) \tag{6}$$

The likelihood calculation circuit 220 outputs the calculation result to the decoder 230-*j*. The decoder 230-*j* decodes the calculation result output from the likelihood calculation circuit 220 (step S205). Accordingly, the decoder 230-*j* acquires the estimated code word ˆ$x^{(j)}$ and the estimation information ˆ$u^{(j)}$. The decoder 230-*j* outputs the estimated code word ˆ$x^{(j)}$ to the likelihood calculation circuit 220, and outputs the estimation information ˆ$u^{(j)}$ to the P/S circuit 240. Note that the likelihood calculation circuit 220 repeats the above processing 1 times by sequentially increasing j from 1 to l.

That is, the likelihood calculation circuit 220 performs the following processing. The likelihood calculation circuit 220 calculates the likelihood based on the estimated code word $\hat{x}^{(1)}$ output from the decoder 230-1 and the communication channel information P2. Next, the likelihood calculation circuit 220 outputs the calculation result to the decoder 230-2, and calculates the likelihood based on the estimated code word $\hat{x}^{(2)}$ output from the decoder 230-2 and the communication channel information P2. Next, the likelihood calculation circuit 220 outputs the calculation result to the decoder 230-3, and calculates the likelihood based on the estimated code word $\hat{x}^{(3)}$ output from the decoder 230-3 and the communication channel information P2.

As described above, the likelihood calculation circuit 220 calculates the likelihood by using the decoding result of the previous decoder 230 and the communication channel information.

In step S210, the P/S circuit 240 converts the estimation information $\hat{u}^{(1)}$ to $\hat{u}^{(l)}$ output from the decoders 230-1 to 230-1 into serial data by parallel-serial conversion. Specifically, the P/S circuit 240 combines the estimation information $\hat{u}^{(1)}$ to $\hat{u}^{(l)}$ to generate the estimation information $\hat{u}(\hat{u}^{(1)}, \ldots, \hat{u}^{(l)})$.

With the communication system according to the second embodiment configured as described above, the same effects as those of the first embodiment can be achieved.

The communication system according to the second embodiment can also be applied to a case where the transmission device 1a includes three or more encoders 120 and the reception device 2a includes three or more decoders 230. Therefore, convenience can be improved.

As the number of divisions of data in the encoding circuit and the decoding circuit increases, performance deterioration is reduced as a result. As a result, there are many parts with much less noise because the noise is more non-uniform. This is because the number of parts where the FEC-OH is small increases, and performance deterioration at the time of replacement of HDD is reduced.

On the other hand, when the number of divisions is increased, the delay increases. This is because, in the likelihood calculation in the likelihood calculation circuit 220, the next likelihood cannot be calculated without waiting for the result of the preceding code, and thus the delay increases linearly. Furthermore, since many codes are required and the likelihood calculation circuit 220 becomes complicated, the circuit scale also increases. Therefore, performance deterioration can be reduced by increasing the number of divisions as much as possible while satisfying the allowable delay amount.

Modification examples common to the first embodiment and the second embodiment will be described.

The bit conversion circuit 130 may be configured using another kernel configuration method of polar codes described in Reference Literature 1 and 2.

(Reference Literature 1: F. Gabry et al., "Multi-Kernel Construction of Polar Codes", 2017 IEEE International Conference on Communications Workshops (ICC Workshops), pp. 761-765 (2017))

(Reference Literature 2: H. Lin et al., "Linear and Nonlinear Binary Kernels of Polar Codes of Small Dimensions With Maximum Exponents", IEEE Transactions on Information Theory, 61(10), 5253, (2015))

The likelihood calculation circuit 220 may calculate the likelihood by another polar code decoding method described in Reference Literature 3.

(Reference Literature 3: I. Tal et al., "List Decoding of Polar Codes", IEEE Transactions on Information Theory, 61(5) 2213, (2015))

The bit conversion circuit 130 and the likelihood calculation circuit 220 may be non-uniform also in the spatial direction and the frequency axis direction.

Some functional units (for example, the encoding circuits 10 and 10a) included in the transmission devices 1 and 1a and some functional units (for example, the decoding circuits 21 and 21a) included in the reception devices 2 and 2a in the above-described embodiments may be realized by a computer. In such a case, a program for realizing this function may be recorded in a computer-readable recording medium, and a program recorded in the recording medium may be read into a computer system and realized by execution. Note that the "computer system" mentioned herein includes an OS and hardware such as a peripheral device. Also, the "computer-readable recording medium" refers to a portable medium such as a flexible disk, a magneto-optical disc, a ROM, or a CD-ROM, or a storage device such as a hard disk included in the computer system. Further, the "computer-readable recording medium" may include a medium that dynamically retains the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for realizing some of the functions described above, may be realized with a combination of the functions described above and a program already recorded in a computer system, or may be realized with a programmable logic device such as a field programmable gate array (FPGA).

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention can be applied to a communication system using a plurality of encoders and decoders.

REFERENCE SIGNS LIST 1, 1a Transmission device
2, 2a Reception device
10, 10a Encoding circuit
11 Symbol mapper
20 Symbol demapper
21, 21a Decoding circuit
110 S/P circuit
110, 210 S/P circuit
120-1 to 120-l Encoder
130 Bit conversion circuit
140, 240 P/S circuit
220 Likelihood calculation circuit
230-1 to 230-1 Decoder

The invention claimed is:

1. An encoding circuit used for coherent digital signal processing, comprising:
a serial-parallel circuit configured to divide input data into a plurality of pieces of divided data by serial-parallel conversion;
a plurality of encoders configured to encode each of the pieces of divided data using codes with different decoding performance and coding rates; and a bit conversion circuit configured to convert a bit sequence in order to make an amount of noise generated by a communication channel non-uniform among the plurality of pieces of divided data encoded by each of the plurality of encoders, wherein the bit conversion circuit inputs the plurality of pieces of divided data encoded by each of the plurality of encoders via different lanes, and converts the bit sequence by calculating an exclusive OR of the input the plurality of pieces of divided data.

2. An encoding method used for coherent digital signal processing, comprising:

dividing input data into a plurality of pieces of divided data by serial-parallel conversion;

encoding each of the pieces of divided data using codes with different decoding performance and coding rates;

inputting the plurality of pieces of divided data encoded via different lanes, and converting a bit sequence, by calculating an exclusive OR of the input the plurality of pieces of divided data, in order to make an amount of noise generated by a communication channel non-uniform among the plurality of pieces of encoded divided data.

3. A non-transitory computer readable storage medium that stores a computer program to be executed by the computer;

dividing input data into a plurality of pieces of divided data by serial-parallel conversion, encoding each of the divided data using codes with different decoding performance and coding rates, inputting the plurality of pieces of divided data encoded via different lanes, and converting a bit sequence, by calculating an exclusive OR of the input the plurality of pieces of divided data, in order to make an amount of noise generated by a communication channel non-uniform among the plurality of pieces of encoded divided data.

* * * * *